US010069931B2

(12) United States Patent
Wei

(10) Patent No.: US 10,069,931 B2
(45) Date of Patent: Sep. 4, 2018

(54) METHOD AND SYSTEM FOR PUSHING RECOMMENDED FRIEND TO USER OF SOCIAL NETWORK

(71) Applicant: ZTE Corporation, Shenzhen (CN)

(72) Inventor: Xing Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 214 days.

(21) Appl. No.: 14/420,380

(22) PCT Filed: Jun. 25, 2013

(86) PCT No.: PCT/CN2013/077935
§ 371 (c)(1),
(2) Date: Mar. 20, 2015

(87) PCT Pub. No.: WO2014/023138
PCT Pub. Date: Feb. 13, 2014

(65) Prior Publication Data
US 2015/0215421 A1    Jul. 30, 2015

(30) Foreign Application Priority Data
Aug. 8, 2012    (CN) .......................... 2012 1 0280510

(51) Int. Cl.
*H04L 29/08*     (2006.01)
*G06N 5/02*      (2006.01)
(Continued)

(52) U.S. Cl.
CPC ............. *H04L 67/306* (2013.01); *G06N 5/02* (2013.01); *G06Q 30/0282* (2013.01);
(Continued)

(58) Field of Classification Search
CPC ....... H04L 67/306; H04L 67/22; H04L 67/26; G06N 5/02; G06Q 30/0282; G06Q 50/01; H04W 4/206
(Continued)

(56) References Cited

U.S. PATENT DOCUMENTS 8,244,851 B1 *   8/2012   Postoaca ................ G06Q 50/01
                                                          709/205
8,683,322 B1 *   3/2014   Cooper ................. H04L 63/102
                                                          707/602
(Continued)

FOREIGN PATENT DOCUMENTS

CN       101079714 A       11/2007
CN       102004788 A       4/2011
(Continued)

OTHER PUBLICATIONS

International Search Report of PCT/CN2013/077935, dated Oct. 3, 2013.

*Primary Examiner* — Kostas Katsikis
(74) *Attorney, Agent, or Firm* — Banner & Witcoff, Ltd.

(57) ABSTRACT

Disclosed are a method and a system for pushing recommended friends to a user on a social networking site, wherein, the method includes: automatically analyzing usage information of each user on a current social networking site to obtain feature information of each user; matching feature information of a user on the current social network with feature information of other users on the current social networking site to obtain matching goodness-of-fit values of feature information between the user and the other users; determining users corresponding to matching goodness-of-fit values which are greater than a preset goodness-of-fit value as matching users of the user; sending friend recommendation information to the user, wherein the friend recommendation information includes information of each (Continued)

matching user. The present document can achieve that a social networking site actively recommends friends to a user.

4 Claims, 3 Drawing Sheets

(51) Int. Cl.
*H04W 4/21* (2018.01)
*G06Q 30/02* (2012.01)
*G06Q 50/00* (2012.01)
*H04W 4/20* (2018.01)

(52) U.S. Cl.
CPC .............. *G06Q 50/01* (2013.01); *H04L 67/22* (2013.01); *H04L 67/26* (2013.01); *H04W 4/206* (2013.01); *H04W 4/21* (2018.02)

(58) Field of Classification Search
USPC ......................................................... 709/204
See application file for complete search history.

(56) References Cited

U.S. PATENT DOCUMENTS

| | | | |
|---|---|---|---|
| 9,003,505 B2* | 4/2015 | Brown | G06Q 50/01 709/227 |
| 9,773,063 B2* | 9/2017 | Shi | G06F 17/30867 |
| 2007/0168529 A1* | 7/2007 | Taylor | G06F 17/3089 709/229 |
| 2009/0083117 A1* | 3/2009 | Svendsen | G06F 17/30209 709/205 |
| 2009/0157795 A1* | 6/2009 | Black | G06Q 10/10 709/202 |
| 2009/0271370 A1* | 10/2009 | Jagadish | G06Q 10/10 |
| 2010/0100416 A1* | 4/2010 | Herbrich | G06Q 30/02 705/7.32 |
| 2010/0268661 A1* | 10/2010 | Levy | G06Q 30/02 705/347 |
| 2010/0293476 A1* | 11/2010 | Rosenblum | H04L 12/6418 715/753 |
| 2010/0299340 A1* | 11/2010 | Murthy | G06Q 10/10 707/759 |
| 2010/0332330 A1* | 12/2010 | Goel | G06Q 30/02 705/14.66 |
| 2011/0113249 A1* | 5/2011 | Gelbard | H04L 9/3236 713/170 |
| 2011/0119230 A1* | 5/2011 | Zuber | G06F 17/30011 707/608 |
| 2011/0145719 A1* | 6/2011 | Chen | G06Q 10/10 715/739 |
| 2011/0153377 A1* | 6/2011 | Novikov | G06Q 10/063 705/7.11 |
| 2011/0153421 A1* | 6/2011 | Novikov | G06Q 30/02 705/14.52 |
| 2011/0191352 A1 | 8/2011 | Jones et al. | |
| 2011/0258316 A1* | 10/2011 | Rizk | G06Q 30/02 709/225 |
| 2011/0289011 A1* | 11/2011 | Hull | G06Q 10/107 705/319 |
| 2012/0041982 A1* | 2/2012 | Jennings | G06F 17/30265 707/784 |
| 2012/0124202 A1* | 5/2012 | Cooper | G06F 17/30035 709/224 |
| 2012/0158715 A1* | 6/2012 | Maghoul | G06F 17/30867 707/728 |
| 2012/0158720 A1* | 6/2012 | Luan | G06F 17/30867 707/732 |
| 2012/0198358 A1* | 8/2012 | Carrer | G06Q 10/10 715/753 |
| 2012/0203640 A1* | 8/2012 | Karmarkar | G06F 1/1686 705/14.66 |
| 2012/0259915 A1* | 10/2012 | Bhatt | G06Q 50/01 709/204 |
| 2013/0086641 A1* | 4/2013 | Mehr | G06F 21/552 726/4 |
| 2013/0110583 A1* | 5/2013 | Ormont | G06Q 30/0251 705/7.29 |
| 2013/0151539 A1* | 6/2013 | Shi | G06F 17/30867 707/754 |
| 2013/0166574 A1* | 6/2013 | Kang | G06Q 30/02 707/749 |
| 2013/0297697 A1* | 11/2013 | Haimovitch | H04L 67/26 709/204 |
| 2014/0040434 A1* | 2/2014 | Rybak | G07C 5/008 709/219 |
| 2014/0046966 A1* | 2/2014 | Jensen | G06F 17/30699 707/754 |
| 2014/0189056 A1* | 7/2014 | St. Clair | H04L 67/303 709/217 |
| 2014/0280592 A1* | 9/2014 | Zafarani | H04L 67/22 709/204 |
| 2015/0019581 A1* | 1/2015 | Svendsen | G06F 17/30209 707/758 |
| 2016/0188736 A1* | 6/2016 | Richter | G06F 17/30867 707/728 |
| 2017/0237746 A1* | 8/2017 | Mehr | H04L 63/105 726/22 |
| 2018/0091522 A1* | 3/2018 | Mehr | G06Q 50/01 |

FOREIGN PATENT DOCUMENTS

CN            102831202 A     12/2012
WO    WO 2011082995 A1 *   7/2011           G06Q 10/10

\* cited by examiner

METHOD AND SYSTEM FOR PUSHING RECOMMENDED FRIEND TO USER OF SOCIAL NETWORK

TECHNICAL FIELD

The present document relates to Internet technology, and more particularly, to a method and system for pushing recommended friends to a user on a social networking site.

BACKGROUND

In recent years, the number of social networking sites continues to increase, and there are more and more users using the social networking sites. Currently, the social networking sites can not actively recommend friends to users, and there are two methods for a user adding a friend, the first one is: obtaining the account or nickname of a friend to be added according to the friend's self recommendation or recommendation information from an intermediate friend, and entering into the friend's page to perform the adding operation by searching for the account or nickname; the second one is: selecting a friend by browsing pages of other users in the massive users in the social networking site, and performing the adding operation on the page of the selected user. However, the number of friends added with the first method is limited, and it needs to search by the account or nickname, and using the first method to add friends does not help the user form a larger social circle; while using the second method to add friends not only wastes time and energy, but also is of low efficiency and is not conducted for the user to form a larger social circle. Moreover, neither of the abovementioned two methods is able to make the user more efficiently find like-minded friends or promote the healthy development of a social networking site.

SUMMARY

In view of this, the main objective of the present document is to provide a method and system for pushing recommended friends to a user on a social networking site, to actively recommend friends to the user efficiently, and further help the user form a larger social circle.

To achieve the abovementioned objective, the technical solution in accordance with the embodiment of the present document is achieved as this:

the embodiment of the present document provides a method for pushing recommended friends to a user on a social networking site, and the method comprises:

automatically analyzing usage information of each user on a current social networking site to obtain feature information of each user;

matching feature information of a user on the current social networking site with feature information of other users on the current social networking site to obtain matching goodness-of-fit values of feature information between the user and the other users;

determining users corresponding to matching goodness-of-fit values which are greater than a preset goodness-of-fit value as matching users of the user;

sending a friend recommendation information to the user, wherein the friend recommendation information comprises information of each matching user.

Preferably, after obtaining the feature information of each user, the method further comprises:

automatically analyzing the received usage information of each user on other social networking sites cooperating with the current social networking site to obtain feature information of each user on the cooperating social networking sites;

accordingly, matching feature information of a certain user on the current social networking site with feature information of other users on the current social networking site is matching the feature information of a certain user on the current social networking site with feature information of other users on the current social networking site and the cooperating social networking sites.

Preferably, after determining the users corresponding to matching goodness-of-fit values which are greater than a preset goodness-of-fit value as matching users of the user, the method further comprises: sending a friend recommendation information to each matching user, and the friend recommendation information comprises information of the user.

Preferably, the friend recommendation information further comprises:

a matching goodness-of-fit value of feature information between the user and each matching user, as well as the matching consistent feature information.

Preferably, before sending the friend recommendation information to the user, the method further comprises:

judging whether the user has already added all of the matching user as friends or not, when the user has not added all of the matching users as friends, performing an operation of sending a friend recommendation information to the user, wherein the friend recommendation information comprises information of each matching user who has not been added as a friend yet.

Preferably, said automatically analyzing usage information of each user on the current social networking site to obtain feature information of each user is:

periodically and automatically analyzing usage information of each user on the current social networking site according to a preset frequency to obtain feature information of each user.

The embodiment of the present document provides a system for pushing recommended friends to a user on a social networking site, and the system comprises: an automatic analysis unit, a matching unit, a matching user determination unit and a friend recommendation information sending unit; wherein, the automatic analysis unit is configured to automatically analyze usage information of each user on the current social networking site to obtain feature information of each user;

the matching unit is configured to match feature information of a user on the current social networking site with feature information of other users on the current social networking sites to obtain matching goodness-of-fit values of feature information between the user and the other users;

the matching user determination unit is configured to determine users corresponding to matching goodness-of-fit values which are greater than a preset goodness-of-fit value as matching users of the user;

the friend recommendation information sending unit is configured to send a friend recommendation information to the user, wherein the friend recommendation information comprises information of each matching user determined by the matching user determination unit.

Preferably, the automatic analysis unit is further configured to automatically analyze the received usage information of each user on other social networking sites cooperating with the current social networking site to obtain feature information of each user on the cooperating social networking sites;

accordingly, the matching unit is configured to match the feature information of a certain user with the feature information of other users on the current social networking site and the cooperating social networking sites.

Preferably, the friend recommendation information sending unit is further configured to send the friend recommendation information to each determined matching user, wherein the friend recommendation information comprises information of the user.

Preferably, the system further comprises: an adding judgment unit, the adding judgment unit is configured to judge whether the user has added all the matching users determined by the matching user determination unit as friends or not, when determining that the user has not added all the matching users as friends, notify the friend recommendation information sending unit to perform the operation of sending the friend recommendation information to the user;

accordingly, the friend recommendation information sending unit is further configured to send the friend recommendation information to the user in accordance with a notification sent by the adding judgment unit, wherein the friend recommendation information comprises information of each matching user who has not been added as a friend yet.

Preferably, the automatic analysis unit is configured to automatically analyze usage information of each user on the current social networking site periodically according to the preset frequency to obtain feature information of each user.

From the above description, it can be seen that, the method and system for pushing recommended friends to a user on a social networking site in accordance with an embodiment of the present document automatically analyze usage information of each user on the current social networking site to obtain feature information of each user; match feature information of a certain user on the current social networking site with feature information of other users on the current social networking site to obtain matching goodness-of-fit values of feature information between the user and the other users; determine users corresponding to matching goodness-of-fit values which are greater than a preset goodness-of-fit value as matching users of the user; send friend recommendation information to the user, and the friend recommendation information comprises information of each matching user, therefore, it is possible to actively recommend friends to the user according to the feature information of the user on the social networking site, and it is made that the user is allowed to find like-minded friends more efficiently, which helps the user to form a larger social circle, and promotes the healthy development of a social networking site.

PREFERRED EMBODIMENTS OF THE DOCUMENT

The basic idea of the present document is: matching the feature information of a certain user on the current social networking site with feature information of other users on the current social networking site to obtain matching goodness-of-fit values of feature information between the user and the other users; determining users corresponding to matching goodness-of-fit values which are greater than a preset goodness-of-fit value as matching users of the user; sending friend recommendation information to the user, wherein the friend recommendation information comprises information of the determined matching users.

Figure 1:
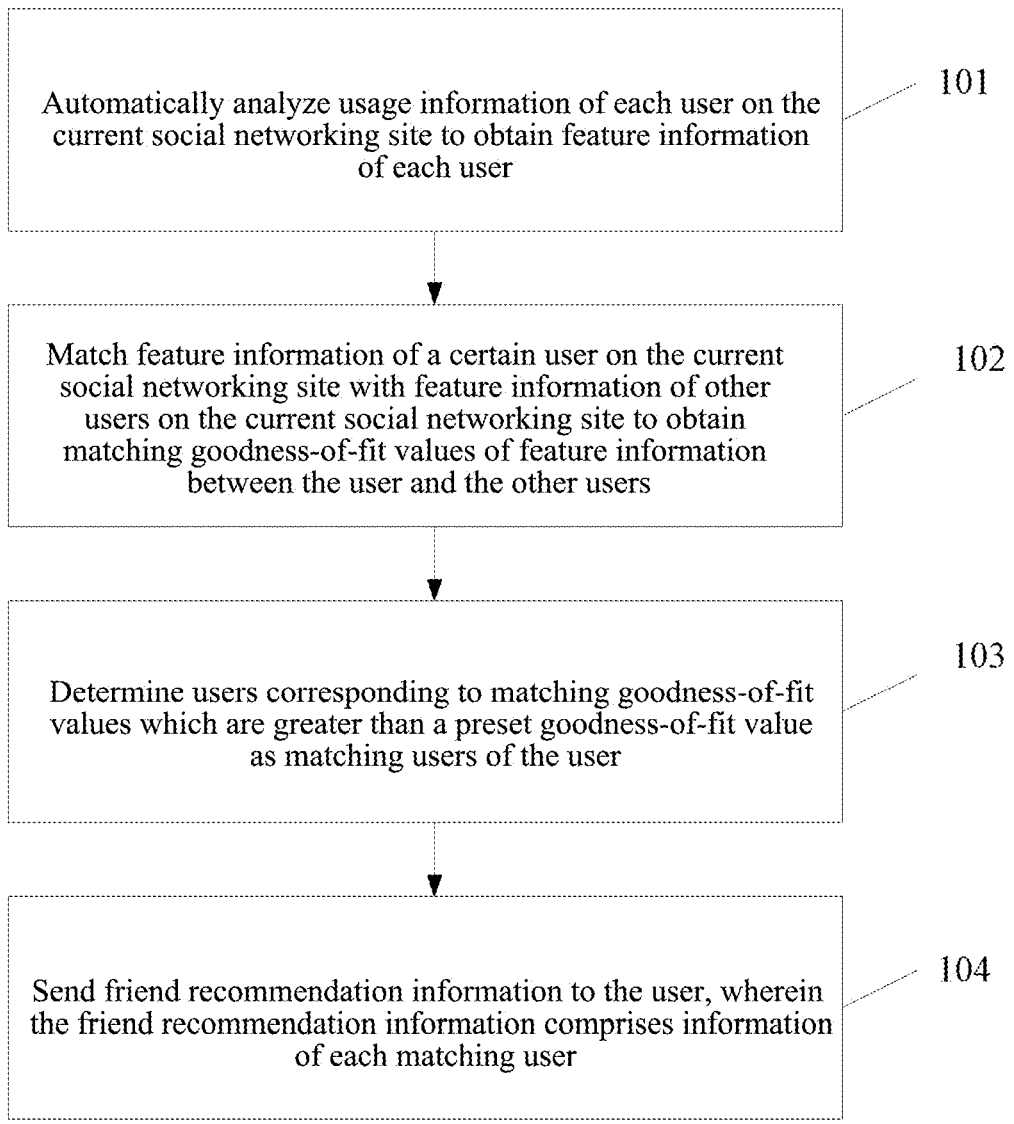
FIG. 1 is a flow chart of the first embodiment of a method for pushing recommended friends to a user on a social networking site in accordance with the present document.

The implementation process of the first embodiment of the method for pushing recommended friends to a user on a social networking site in accordance with the present document, as shown in FIG. 1, comprises the following steps.

In step 101, usage information of each user on the current social networking site is automatically analyzed to obtain feature information of each user.

Herein, the usage information refers to information such as personal information, habits, hobbies, current state shown by the user in the process of using the social networking site. The feature information may comprise hobbies, occupation, location and other information.

Specifically, said automatically analyzing the usage information of each user on the current social networking site to obtain feature information of each user may be as: periodically and automatically analyzing usage information of each user on the current social networking site according to the preset frequency to obtain feature information of each user.

Herein, the preset frequency may be an initial default value of the social networking site, or a value reset by the user according to the user's own requirements.

In step 102, the feature information of a certain user on the current social networking site is matched with feature information of other users on the current social networking site to obtain matching goodness-of-fit values of feature information between the user and the other users.

In step 103, the users corresponding to matching goodness-of-fit values which are greater than a preset goodness-of-fit value as matching users of the user is determined.

Herein, the preset goodness-of-fit value can an initial default value of the social networking site, or a value reset by the user according to the user's own requirements.

In step 104, it is to send friend recommendation information to the user, wherein the friend recommendation information comprises information of each matching user.

Preferably, the friend recommendation information may further comprise: the matching goodness-of-fit value of feature information between the user and each matching user, as well as the matching consistent feature information.

Preferably, after the step 101, the method may further comprise: automatically analyzing the received usage information of each user on other social networking sites cooperating with the current social networking site to obtain the feature information of each user on the cooperating social networking sites.

Accordingly, said matching feature information of a certain user on the current social networking site with feature information of other users on the current social networking site in step 102 can be: matching the feature information of a certain user on the current social networking site with feature information of other users on the current social networking site as well as the cooperating social networking sites.

Preferably, after the step 103, the method may further comprise: sending the friend recommendation information to each matching user, and the friend recommendation information comprises information of the user.

Preferably, before the step 104, the method further comprises: judging whether the user has already added all the matching users as friends or not, when the user has not added all the matching users as friends, executing step 104, at this time, the friend recommendation information comprises information of each matching user which has not been added as a friend yet.

Figure 2:
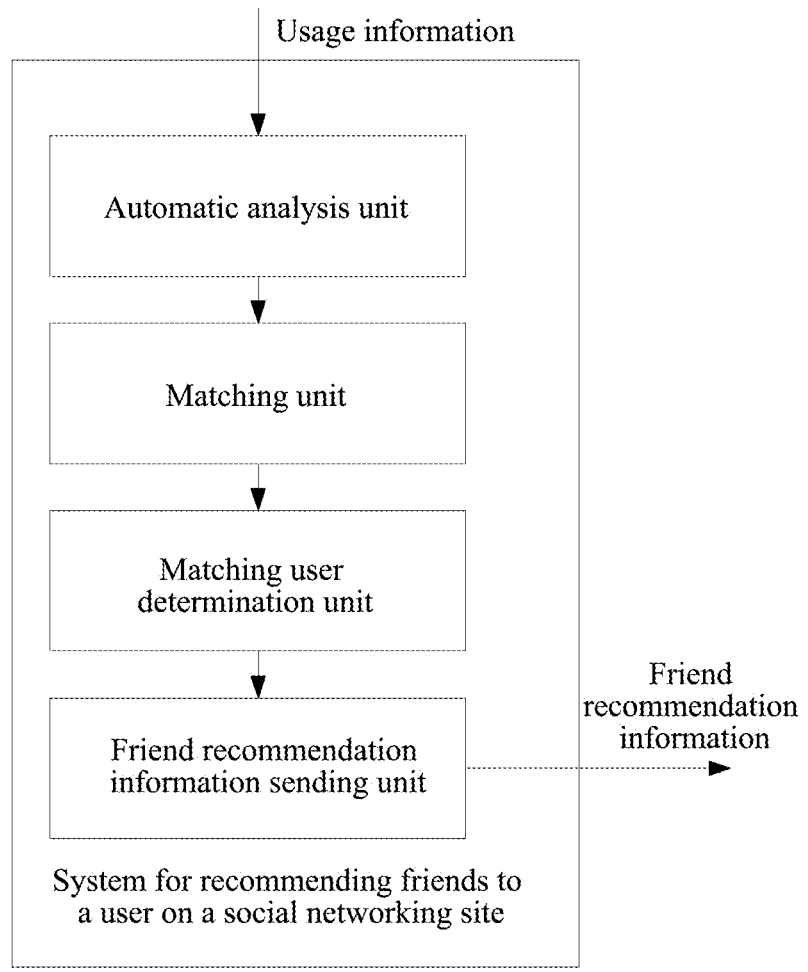
FIG. 2 is a schematic diagram of the structure of an embodiment of a system for pushing recommended friends to a user on a social networking site in accordance with the present document.

The composition structure of an embodiment of the system for pushing recommended friends to a user on a social networking site in accordance with the present document is shown in FIG. 2, comprising: an automatic analysis unit, a matching unit a matching user determination unit and a friend recommendation information sending unit; wherein, the automatic analysis unit is configured to automatically analyze usage information of each user on the current social networking site to obtain feature information of each user;

Preferably, the automatic analysis unit is configured to automatically analyze the usage information of each user on the current social networking site periodically according to the preset frequency to obtain feature information of each user.

The matching unit is configured to match feature information of a certain user on the current social networking site with feature information of other users on the current social networking sites to obtain matching goodness-of-fit values of feature information between the user and the other users;

the matching user determination unit is configured to determine users corresponding to matching goodness-of-fit values which are greater than a preset goodness-of-fit value as matching users of the user;

the friend recommendation information sending unit is configured to send the friend recommendation information to the user, wherein the friend recommendation information comprises information of each matching user determined by the matching user determination unit.

Preferably, the automatic analysis unit is further configured to automatically analyze the received usage information of each user on other social networking sites cooperating with the current social networking site to obtain feature information of each user on the cooperating social networking sites.

Accordingly, the matching unit is configured to match the feature information of a certain user with the feature information of other users on the current social networking site as well as the cooperating social networking sites.

Preferably, the friend recommendation information sending unit is further configured to send the friend recommendation information to each determined matching user, wherein the friend recommendation information comprises information of the user.

Preferably, the system further comprises: an adding judgment unit, and the adding judgment unit is configured to judge whether the user has added all the matching users determined by the matching user determination unit as friends or not, when determining that the user has not added all the matching users as friends, notify the friend recommendation information sending unit to perform the operation of sending the friend recommendation information to the user.

Accordingly, the friend recommendation information sending unit is further configured to send the friend recommendation information to the user in accordance with the notification sent by the adding judgment unit, wherein the friend recommendation information comprises information of each matching user who has not been added as a friend yet.

Figure 3:
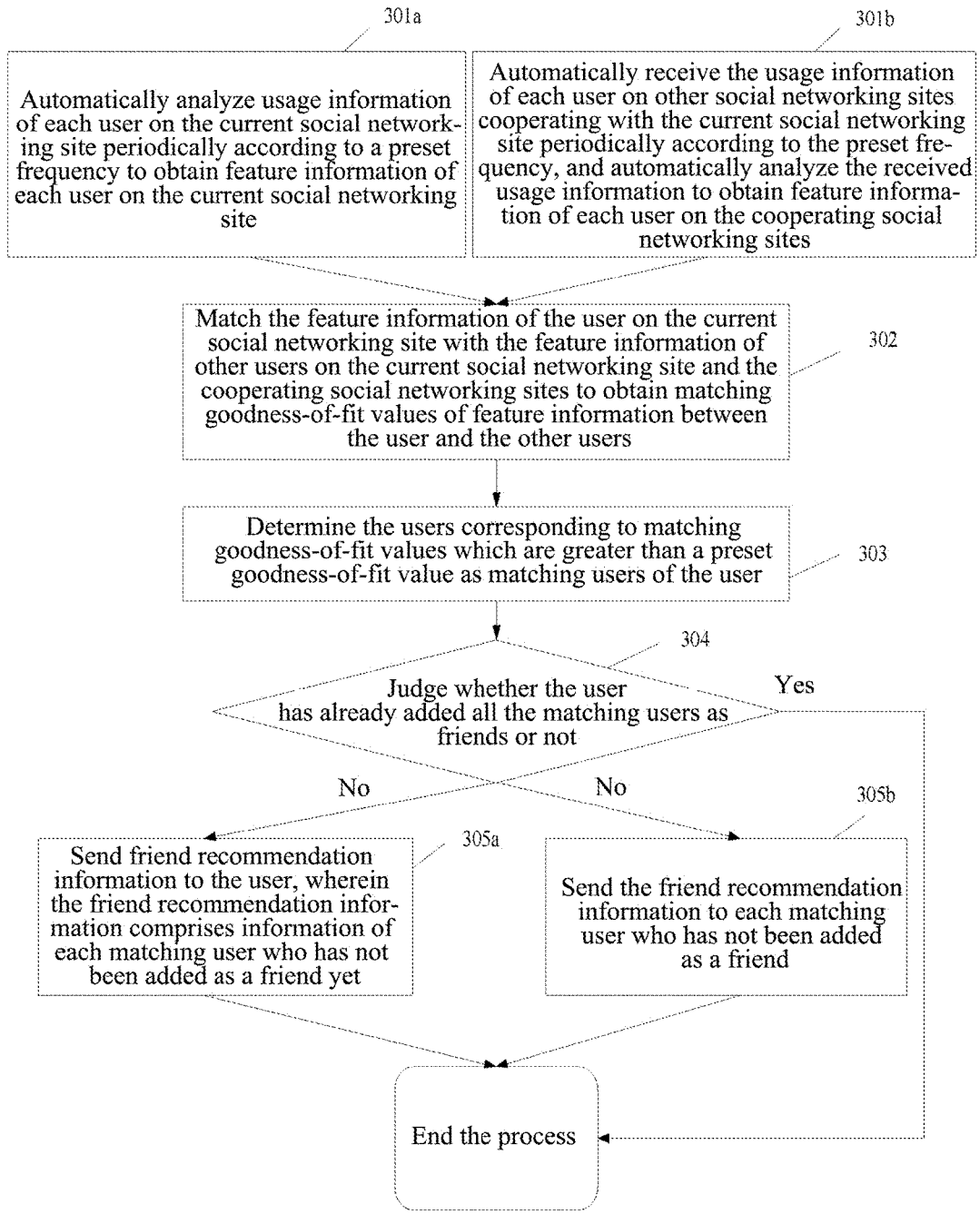
FIG. 3 is a flow chart of the second embodiment of a method for pushing recommended friends to a user on a social networking site in accordance with the present document.

The implementation process of the second embodiment of the method for pushing recommended friends to a user on the social networking site in accordance with the present document, as shown in FIG. 3, comprises the following steps.

In step 301*a*, usage information of each user on the current social networking site is automatically analyzed periodically according to a preset frequency to obtain feature information of each user on the current social networking site.

Herein, the usage information refers to personal information, habits, hobbies, current state and other information shown by the user in the process of using the social networking site. The feature information may comprise hobbies, occupation, location and other information.

For example: feature information of the user's location is obtained by automatically analyzing the user's registration information; or the feature information of the user's interest in music is obtained based on the very often interaction between the user and the music-loving people on the social networking site; or the feature information of the user belonging to the IT industry is obtained according to that the user recently publishes a lot of information about the Android operating system.

Because the user's feature information will change, the new feature information is used to replace the old feature information. For example: the location of a new user provided in the registration information is Beijing, according to the user's registration information, the feature information that the user's location is Beijing can be obtained; but the IP address that the user uses to log on the social networking site belongs to Shanghai, then the new feature information that the user's location is Shanghai can be obtained, and the new feature information that the user's location is Shanghai is used to cover the old feature information that the user's location is Beijing.

Herein, the name and the feature information of each user may be stored correspondingly to form a feature information database to facilitate recalling and modifying the feature information of each user.

The preset frequency can be an initial default value of the social networking site, or a value reset by the user based on the user's own requirements.

In step 301*b*, the usage information of each user on other social networking sites cooperating with the current social networking site is automatically received periodically according to the preset frequency, and the received usage information is automatically analyzed to obtain feature information of each user on the cooperating social networking sites.

Herein, the usage information refers to personal information, habits, hobbies, current state, friend lists, recent interest contents and other information shown by the user in the process of using the social networking site.

The feature information may comprise hobbies, occupation, location, and information about whether friends of the user on the cooperating social networking sites are users on the current social networking site or not.

Because the information shown by the user in the process of using different social networking sites may be different, new feature information may be added. For example: the user likes music on the current social networking site, and likes football on the cooperating social networking sites, therefore the feature information that the user likes music and football can be obtained.

In step 302, the feature information of the user on the current social networking site is matched with the feature information of other users on the current social networking site and the cooperating social networking sites to obtain matching goodness-of-fit values of feature information between the user and the other users.

In step 303, the users corresponding to matching goodness-of-fit values which are greater than a preset goodness-of-fit value are determined as matching users of the user.

The preset goodness-of-fit value is an initial default value of the social networking site, or a value reset by the user based on the user's own requirements.

In step 304, it is to judge whether the user has added all the matching users as friends or not, and proceed to step 305 when the user has not added all the matching users as friends; end this process when the user has added all the matching users as friends.

In step 305a, friend recommendation information is sent to the user, wherein the friend recommendation information comprises information of each matching user who has not been added as a friend yet.

Herein, the friend recommendation information may further comprise: the matching goodness-of-fit value of feature information between the user and each matching user who has not been added as a friend yet, as well as the matching consistent feature information.

In step 305b: the friend recommendation information is respectively sent to each matching user who has not been added as a friend, and the friend recommendation information comprises information of the user, the matching goodness-of-fit value of feature information between the user and each matching user who has not been added as a friend yet, as well as the matching consistent feature information.

In this way, the users on the social networking sites can periodically receive the friend recommendation information, the user can judge whether to add friends recommended by the social networking site or not according to the contents in the friend recommendation information, and avoid blindly searching for friends, thereby allowing the user to more efficiently find like-minded friends and helping the user to form a larger social circle.

The above description is only preferred embodiments of the present document, and is not intended to limit the protection scope of the present document.

INDUSTRIAL APPLICABILITY

The present document discloses a method and a system for pushing recommended friends to a user on a social networking site, wherein, the method includes: automatically analyzing usage information of each user on a current social networking site to obtain feature information of each user; matching feature information of a user on the current social network with feature information of other users on the current social networking site to obtain respective matching goodness-of-fit values of feature information between the user and the other users; determining users corresponding to matching goodness-of-fit values which are greater than a preset goodness-of-fit value as matching users of the user; sending friend recommendation information to the user, wherein the friend recommendation information includes information of each matching user. The present document can achieve that a social networking site actively recommends friends to a user.

What is claimed is:

1. A method for pushing recommended friends to a user on a social networking site, wherein the method comprises:

automatically analyzing, by a first social networking site, usage information of each user on the first social networking site to obtain feature information of each user on the first social networking site, wherein the usage information of the each user on the first social networking site refers to information comprising personal information, habits, hobbies, and a current state shown by the each user during using the first social networking site, and the feature information of the each user on the first social networking site comprises hobbies, occupation and location of the each user on the first social networking site; wherein automatically analyzing the usage information of the each user on the first social networking site to obtain feature information of the each user on the first social networking site comprises: obtaining the each user's location by analyzing the each user's registration information; obtaining the each user's hobbies according to the interactions between the each user with other people on the first social networking site; and obtaining the each user's occupation according to information published by the each user;

receiving, by the first social networking site, usage information of each user on a second social networking site cooperating with the first social networking site, wherein the usage information of the each user on the second social networking site refers to information comprising personal information, habits, hobbies, and a current state shown by the each user during using the second social networking site;

automatically analyzing, by the first social networking site, the usage information of each user on the second social networking site cooperating with the first social networking site to obtain feature information of each user on the second social networking site, wherein the feature information of the each user on the second social networking site comprises hobbies, occupation and location of the each user on the second social networking site; wherein automatically analyzing the usage information of the each user on the second social networking site to obtain feature information of the each user on the second social networking site comprises: obtaining the each user's location by analyzing the each user's registration information; obtaining the each user's hobbies according to the interactions between the each user with other people on the second social networking site; and obtaining the each user's occupation according to information published by the each user;

matching, by the first social networking site, feature information of a user on the first social networking site with feature information of other users on the first social networking site and with feature information of other users on the second social networking site;

obtaining, by the first social networking site, based on the matching, matching goodness-of-fit values of feature information between the user and the other users;

determining, by the first social networking site, users corresponding to matching goodness-of-fit values which are greater than a preset goodness-of-fit value as matching users of the user;

sending, by the first social networking site, a friend recommendation information to the user, wherein the friend recommendation information comprises information of each matching user; and sending, by the first social networking site, a friend recommendation information to the each matching user, wherein the friend recommendation information comprises information of the user.

2. The method of claim 1, wherein, before sending the friend recommendation information to the user, the method further comprises:

judging whether the user has already added all of the matching users as friends or not, when the user has not added all of the matching users as friends, performing an operation of sending the friend recommendation information to the user, wherein the friend recommendation information comprises information of each matching user who has not been added as a friend yet.

3. The method of claim 1, wherein, said automatically analyzing usage information of each user on the first social networking site to obtain feature information of each user comprises:

automatically analyzing usage information of each user on the first social networking site periodically according to a preset frequency to obtain feature information of each user.

4. The method of claim 1, wherein, the friend recommendation information further comprises:

a matching goodness-of-fit value of feature information between the user and each matching user, as well as matching consistent feature information.

* * * * *